(12) United States Patent
Lee

(10) Patent No.: US 7,346,737 B2
(45) Date of Patent: Mar. 18, 2008

(54) CACHE SYSTEM HAVING BRANCH TARGET ADDRESS CACHE

(75) Inventor: Hoi-Jin Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 319 days.

(21) Appl. No.: 11/114,464

(22) Filed: Apr. 26, 2005

(65) Prior Publication Data

US 2005/0268040 A1    Dec. 1, 2005

(30) Foreign Application Priority Data

May 29, 2004    (KR) ................. 10-2004-0038710

(51) Int. Cl.
*G06F 12/00* (2006.01)

(52) U.S. Cl. .................. 711/125; 711/145; 711/154; 712/238; 712/239

(58) Field of Classification Search ................. 711/125, 711/145, 154; 712/238, 239
See application file for complete search history.

(56) References Cited

U.S. PATENT DOCUMENTS

| | | | | |
|---|---|---|---|---|
| 5,822,576 A | 10/1998 | Dinkjian et al. | ............ | 395/586 |
| 5,848,269 A | * 12/1998 | Hara | ........................... | 712/239 |
| 5,933,850 A | * 8/1999 | Kumar et al. | ............... | 711/125 |
| 6,247,097 B1 | * 6/2001 | Sinharoy | .................... | 711/125 |
| 6,253,316 B1 | 6/2001 | Tran et al. | .................. | 712/239 |

FOREIGN PATENT DOCUMENTS

| JP | 2000-132391 | 5/2000 |
|---|---|---|
| KR | 10-0276138 | 9/2000 |

* cited by examiner

*Primary Examiner*—Stephen C. Elmore
(74) *Attorney, Agent, or Firm*—Mills & Onello LLP

(57) ABSTRACT

A cache system has a branch target address cache, including a storage unit for storing branch target address cache (BTAC) access bits each corresponding to cache lines of an instruction cache. The BTAC access bits represent a presence of a branch instruction on the next cache line of a cache line corresponding to the instruction cache. The BTAC is selectively accessed in accordance with values of the BTAC access bits corresponding to I'th (I is a positive integer) cache lines presently accessed in the instruction cache.

32 Claims, 9 Drawing Sheets

Fig. 3

| FE | DE | ISS | EX | WB |

Two Bit State Machine

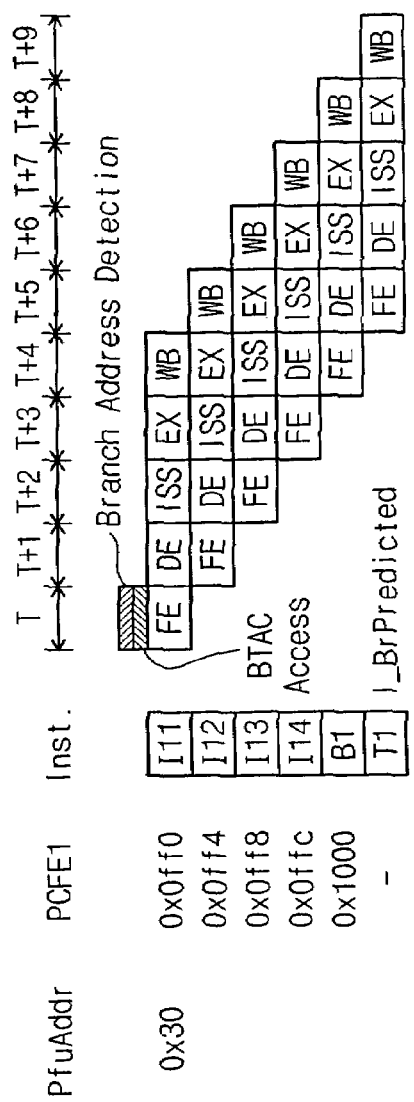
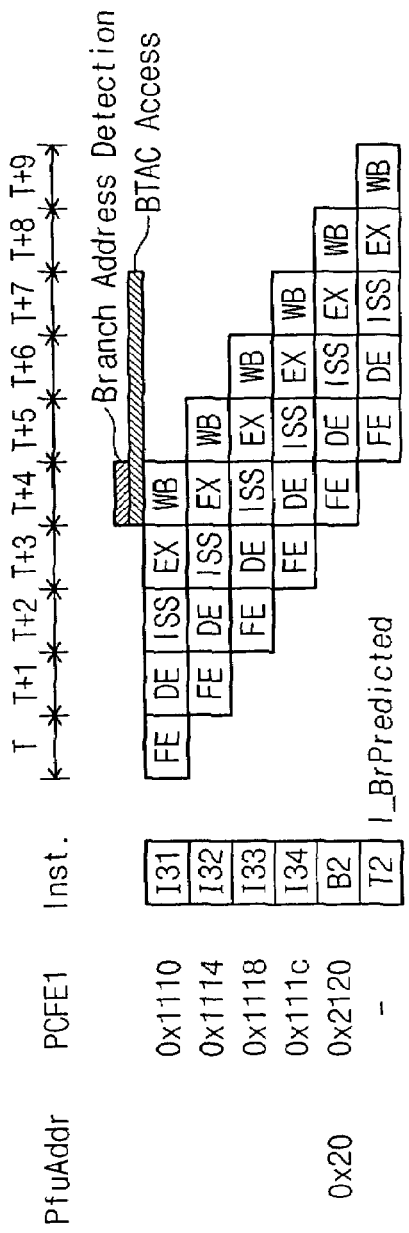

CACHE SYSTEM HAVING BRANCH TARGET ADDRESS CACHE

CROSS-REFERENCE TO RELATED APPLICATIONS

This U.S. non-provisional patent application claims priority under 35 U.S.C. § 119 of Korean Patent Application 2004-38710 filed on May 29, 2004, the entire contents of which are hereby incorporated by reference.

BACKGROUND OF THE INVENTION

The present invention is related to a cache system, and in particular to a cache system including a branch target address cache (BTAC).

In conventional computer systems, a following instruction is processed after completely processing a previous instruction. Improvements in computing technologies have advanced the architectures of pipelining and superscalar configurations. Such architectures enhance the design complexity, and the price, of a computer processor, but provide enhanced processing efficiency.

A cache architecture enhances the performance of a computer system. The cache stores information such as data and instructions, and provides required information within several clock cycles without the need for accessing main memory. Recent cache systems include a branch target address cache that stores branch target addresses, enhancing the performance of a processor employing a pipeline architecture.

FIG. 1 illustrates a typical computer system employing a branch prediction mechanism. The computer system 100 is comprised of a processor 110, a main memory 150, and input/output unit 160. The processor 110 is implemented on a single chip together with a cache system that is constructed of an instruction fetch unit 120, a cache controller 130, and a cache memory 140. While the instruction fetch unit 120 may be regarded as an independent circuit block embedded in the processor 110, being separated from the cache system, it is included in the cache system. The instruction fetch unit 120 predicts a proper instruction sequence for the processor 110 and thereby fetches an instruction from the cache memory 140 or the main memory 150.

FIG. 2 illustrates a conventional architecture of an instruction cache embedded in the cache memory 140 and a branch target address cache (BTAC) embedded in the instruction fetch unit 120.

The instruction fetch unit 120 includes a BTAC composed of a BTAC tag RAM 121 and a BTAC data RAM 122, a saturation counter 123, and a comparator 125. The instruction cache 140 includes an instruction cache tag RAM 141 and an instruction cache data RAM 142. The BTAC determines whether an instruction stored in a currently accessed cache line of the instruction cache is a branch instruction, and provides a predicted branch address.

Figure 3:
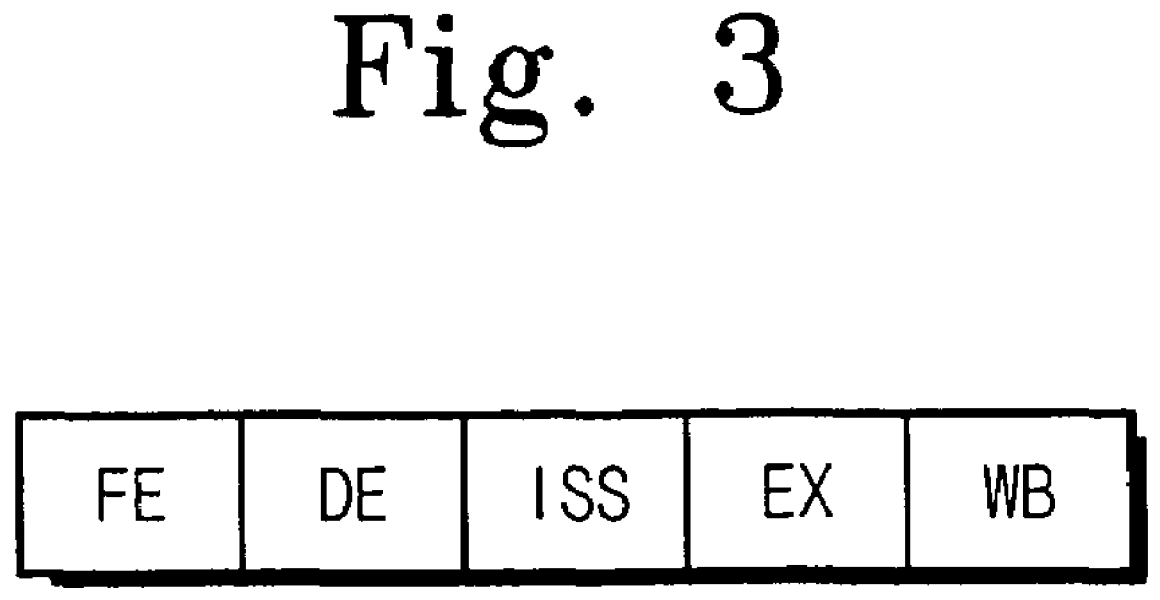

FIG. 3 shows an instruction pipeline in a typical computer system. The instruction pipeline is comprised of five sequential states, i.e., an instruction cache fetch state FE, a decoding state DE, an issue state ISS, an execution state EX, and a writing state WB. The execution state EX prosecutes an address generation, an operand fetch, and an instruction execution.

The instruction fetch unit 120 operates as follows. At the fetch state FE, a fetch address PfuAddr:[6:0]=PEFE[6:0] is provided to an index of the BTAC tag RAM 121 when a specific cache line of the instruction cache is accessed. It outputs a tag address BtacTLAddr[31:7] of the BTAC tag RAM 121 accessed with the index and a predicted branch address BtacTLAddr[31:0] of the BTAC data RAM 122. The comparator 125 compares the tag address BtacTLAddr[31:7], which is provided by the BTAC tag RAM 121, with the next fetch address PCFE[31:7] that is a tag address provided by the processor 110. If the two addresses are identical to each other, an address of an instruction to be fetched after a branch instruction is the address BtacTLAddr[31:0] to be read out from the BTAC data RAM 122. If the two addresses are not identical to each other, then no branch prediction is performed.

Based on the result by the comparator 125, if the two addresses BtacTLAddr[31:7] and PCFE[31:7] are not identical to each other and a decoding result of an instruction B1 is determined as a branch instruction, PCWB[31:0] is written into the index PfuAddr:[6:0]=PCWB[6:0] of the BTAC tag RAM 122 after performing an operation under the writing state WB and an address branched after performing the instruction B1 is written into the BTAC data RAM 122. The value PCWB[31:0] represents an address for the instruction B1 stored in the main memory 150.

In the conventional cache system described above, the BTAC needs to be accessed whenever the instruction cache is accessed in order to predict a branch address. FIGS. 4A and 4B provide sequence illustrations of accessing the BTAC when instructions are being propagated through the instruction pipeline shown in FIG. 3. It can be seen in this example, that the BTAC is accessed whenever the instruction cache is accessed, and the tag addresses stored in the cache instruction tag RAM 141 are generated in sequence (FIG. 4A) as well as in non-sequence (FIG. 4B).

Such a BTAC accessing method is capable of enhancing the operating speed of the cache system by minimizing the occurrence of a pipelining stall because it is able to predict the branch address, but it is insufficient in reducing power consumption due to the need of accessing the BTAC at every cycle.

SUMMARY OF THE INVENTION

The present invention is directed to a cache system capable of reducing power consumption by minimizing the access frequency of the BTAC.

In one aspect, the present invention provides a cache system comprising: an instruction cache including a plurality of cache lines storing tag addresses and instructions; a branch target address cache (BTAC) storing a predicted target address of a branch instruction stored in the instruction cache; a storage unit storing BTAC access bits each corresponding to the cache lines, the BTAC access bit indicating whether a branch instruction is stored in a cache line adjacent a cache line corresponding thereto; and a control logic unit establishing values of the BTAC access bits and selectively accessing the BTAC according to the value of the BTAC access bit corresponding to an I'th cache line currently accessed in the instruction cache.

In one embodiment, when a tag address of the I'th (I is a positive integer) cache line currently accessed and a tag address of the (I−1)'th cache line previously accessed are in sequence and an instruction of the currently accessed I'th cache line is a branch instruction, the control logic unit sets the BTAC access bit of the previously accessed (I−1)'th cache line to a first value.

In another embodiment, when a tag address of the I'th cache line currently accessed and a tag address of the (I−1)'th cache line previously accessed are in sequence and an instruction of the currently accessed I'th cache line is not a branch instruction, the control logic unit sets the BTAC access bit of the previously accessed (I−1)'th cache line to a second value.

In another embodiment, when a tag address of the currently accessed I'th cache line and a tag address of the previously accessed (I−1)'th cache line are not in sequence, the control logic unit sets the BTAC access bit of the previously accessed (I−1)'th cache line to the second value.

In another embodiment, when a BTAC access bit corresponding to the currently accessed I'th cache line of the instruction cache is the first value, the control logic unit accesses the BTAC.

In another embodiment, when a BTAC access bit corresponding to the previously accessed (I−1)'th cache line of the instruction cache is the second value, and a tag address of the currently accessed I'th cache line and a tag address of the previously accessed (I−1)'th cache line are in sequence, the control logic unit does not access the BTAC while accessing the I'th cache line.

In another embodiment, when a BTAC access bit corresponding to the previously accessed (I−1)'th cache line of the instruction cache is the second value, and a tag address of the currently accessed I'th cache line and a tag address of the previously accessed (I−1)'th cache line are not in sequence, the control logic unit accesses the BTAC while accessing the I'th cache line.

In another embodiment, wherein when a tag address of the currently accessed I'th cache line and a tag address of the previously accessed (I−1)'th cache line are not in sequence, the control logic unit accesses the BTAC while accessing the I'th cache line.

In another embodiment, each of the cache lines in the instruction cache stores a tag address and plural instructions.

In another embodiment, when a tag address of the currently accessed I'th cache line and a tag address of the previously accessed (I−1)'th cache line are in sequence and one of instructions on the currently accessed I'th cache line is at least a branch instruction, the control logic unit sets the BTAC access bit corresponding with the previously accessed (I−1)'th cache line to a first value.

In another embodiment, when a tag address of the currently accessed I'th cache line and a tag address of the previously accessed (I−1)'th cache line are in sequence and instructions on the currently accessed I'th cache line are not all branch instructions, the control logic unit sets the BTAC access bit corresponding with the previously accessed (I−1)'th cache line to a second value.

In another embodiment, when a tag address of the currently accessed I'th cache line and a tag address of the previously accessed (I−1)'th cache line are not in sequence, the control logic unit sets the BTAC access bit corresponding with the previously accessed (I−1)'th cache line to a second value.

In another embodiment, when the BTAC access bit corresponding with the currently accessed I'th cache line of the instruction cache is the first value, the control logic unit accesses the BTAC.

In another embodiment, when the BTAC access bit corresponding with the previously accessed (I−1)'th cache line of the instruction cache is the second value and a tag address of the currently accessed I'th cache line and a tag address of the previously accessed (I−1)'th cache line are in sequence, the control logic unit does not access the BTAC while accessing the I'th cache line.

In another embodiment, when the BTAC access bit corresponding with the previously accessed (I−1)'th cache line of the instruction cache is the second value and a tag address of the currently accessed I'th cache line and a tag address of the previously accessed (I−1)'th cache line are not in sequence, the control logic unit accesses the BTAC whenever fetching the instructions of the I'th cache line in sequence.

In another embodiment, when a tag address of the currently accessed I'th cache line and a tag address of the previously accessed (I−1)'th cache line are not in sequence, the control logic unit accesses the BTAC whenever fetching the instructions of the I'th cache line in sequence.

In another embodiment, the instruction cache comprises: an instruction tag cache storing the tag address; and an instruction data cache storing the instruction. Each of the instruction tag and data caches includes a plurality of cache lines, the cache lines of the instruction tag cache corresponding to the cache lines of the instruction data cache.

In another embodiment, the BTAC includes a plurality of BTAC lines storing the predicted target address of the branch instruction stored in the instruction cache.

In another embodiment, an index to access the BTAC lines of the BTAC is identical to an index to access the cache lines of the instruction cache.

In another embodiment, the control logic unit accesses the BTAC line of the BTAC by referring to the index to access the cache lines of the instruction cache.

In another embodiment, an index to access the BTAC lines of the BTAC is partially identical to an index to access the cache lines of the instruction cache.

In another embodiment, the control logic unit accesses the BTAC line of the BTAC by partially referring to the index to access the cache lines of the instruction cache.

In another embodiment, when the BTAC access bit is the first value, the control logic unit accesses the BTAC line of the BTAC only a single time.

In another embodiment, when a tag address of the currently accessed I'th cache line and a tag address of the previously accessed (I−1)'th cache line are not in sequence, the control logic unit accesses the same BTAC line of the BTAC whenever fetching the instructions of the I'th cache line in sequence.

In another aspect of the invention, a method of operating a cache system, which includes an instruction cache including plural cache lines to store tag addresses and instructions, and a branch target address cache (BTAC) storing a predicted target address of a branch instruction stored in the instruction cache, and BTAC access bits each corresponding to the cache lines, for accessing the BTAC, comprises: determining whether a tag address of an I'th (I is a positive integer) cache line currently accessed and a tag address of an (I−1)'th cache line previously accessed are in sequence; determining whether an instruction of the currently accessed I'th cache line is a branch instruction; and setting the BTAC access bit corresponding with the previously accessed (I−1)'th cache line to a first value when the tag addresses of the currently accessed I'th and previously accessed (I−1)'th cache lines are in sequence and the instruction of the currently accessed I'th cache line is the branch instruction.

In one embodiment, the BTAC access bit corresponding with the previously accessed (I−1)'th cache line is set to a second value when the tag addresses of the currently accessed I'th and previously accessed (I−1)'th cache lines are in sequence and the instruction of the currently accessed I'th cache line is not the branch instruction.

In one embodiment, the BTAC access bit corresponding with the previously accessed (I−1)'th cache line is set to a second value when the tag addresses of the currently accessed I'th and previously accessed (I−1)'th cache lines are not in sequence.

In one embodiment, the method further comprises: determining a value of the BTAC access bit corresponding to the currently accessed I'th cache line of the instruction cache; and accessing the BTAC when the BTAC access bit corresponding with the currently accessed I'th cache line is the first value.

In one embodiment, the method further comprises: determining whether the tag addresses stored in the currently accessed I'th and previously accessed (I−1)'th cache lines are in sequence; and accessing the BTAC while accessing the I'th cache line when the BTAC access bit is the second value in correspondence with the previously accessed (I−1)'th cache line and the tag addresses of the currently accessed I'th and previously accessed (I−1)'th cache lines are not in sequence.

In one embodiment, the method further comprises not accessing the BTAC while accessing the I'th cache line when the BTAC access bit corresponding with the previously accessed (I−1)'th cache line is the second value and the tag addresses of the currently accessed I'th and previously accessed (I−1)'th cache lines are in sequence.

In one embodiment, each of the cache lines in the instruction cache stores a tag address and plural instructions.

In one embodiment, the method further comprises accessing the BTAC whenever fetching the instructions of the I'th cache line in sequence when the BTAC access bit corresponding with the previously accessed (I−1)'th cache line is the second value and the tag addresses of the currently accessed I'th and previously accessed (I−1)'th cache lines are not in sequence.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings:

FIG. 3 illustrates an instruction pipeline in a conventional computer system;

FIG. 9A illustrates a pipelining feature of accessing the BTAC when tag addresses stored in (I−1)'th and I'th cache lines of an instruction cache tag RAM are generated in sequence, in accordance with the present invention; and FIG. 9B illustrates a pipelining feature of accessing the BTAC when tag addresses stored in (I−1)'th and I'th cache lines of an instruction cache tag RAM are generated in non-sequence, in accordance with the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, an exemplary embodiment of the present invention will be described in conjunction with the accompanying drawings.

Figure 5:
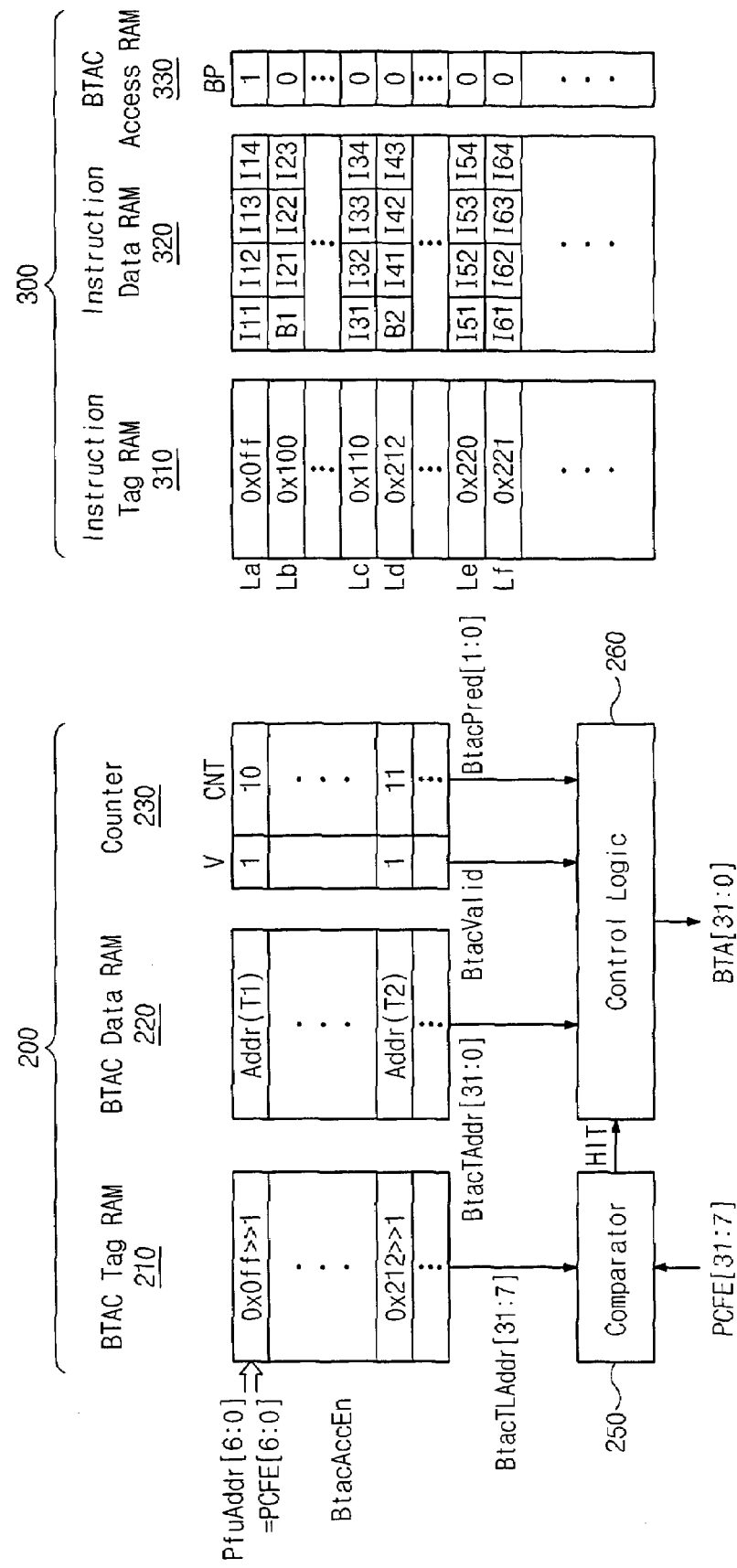
FIG. 5 is a block diagram illustrating a cache system according to a preferred embodiment of the present invention.

FIG. 5 illustrates a cache system according to a preferred embodiment of the present invention. Similar to the cache system described above, an instruction fetch unit 200 is comprised of a BTAC including a BTAC tag RAM 210 and a BTAC data RAM 220, a saturation counter 230, and a comparator 250. Also included is a control logic unit 260. A cache memory 300 includes an instruction cache tag RAM 310, an instruction cache data RAM 320, and a BTAC access RAM 330 for storing BTAC access bits. The instruction cache data RAM 320 according to a preferred embodiment of the invention stores four instructions in each cache line. Therefore, the four instructions are fetched from the data RAM 320 when a cache hit is generated in the instruction cache tag RAM 310 according to addresses provided by the processor, and then carried out in sequence.

The BTAC access RAM 330 according to a preferred embodiment of the invention stores the BTAC access bits BP[n], each corresponding to n cache lines of the instruction cache. A BTAC access bit value of '1' represents that there is a branch instruction on the next cache line of a cache line corresponding thereto. The operation of the control logic unit 260 in response to the value of the BTAC access bit and an establishment of the BTAC access bit, will be described below in detail.

The control logic unit 260 controls access operations for the BTAC tag RAM 210 and the BTAC data RAM 220 in accordance with the BTAC access bits stored in the BTAC access RAM 330, and outputs a branch address BTA[31:0].

Figure 6:
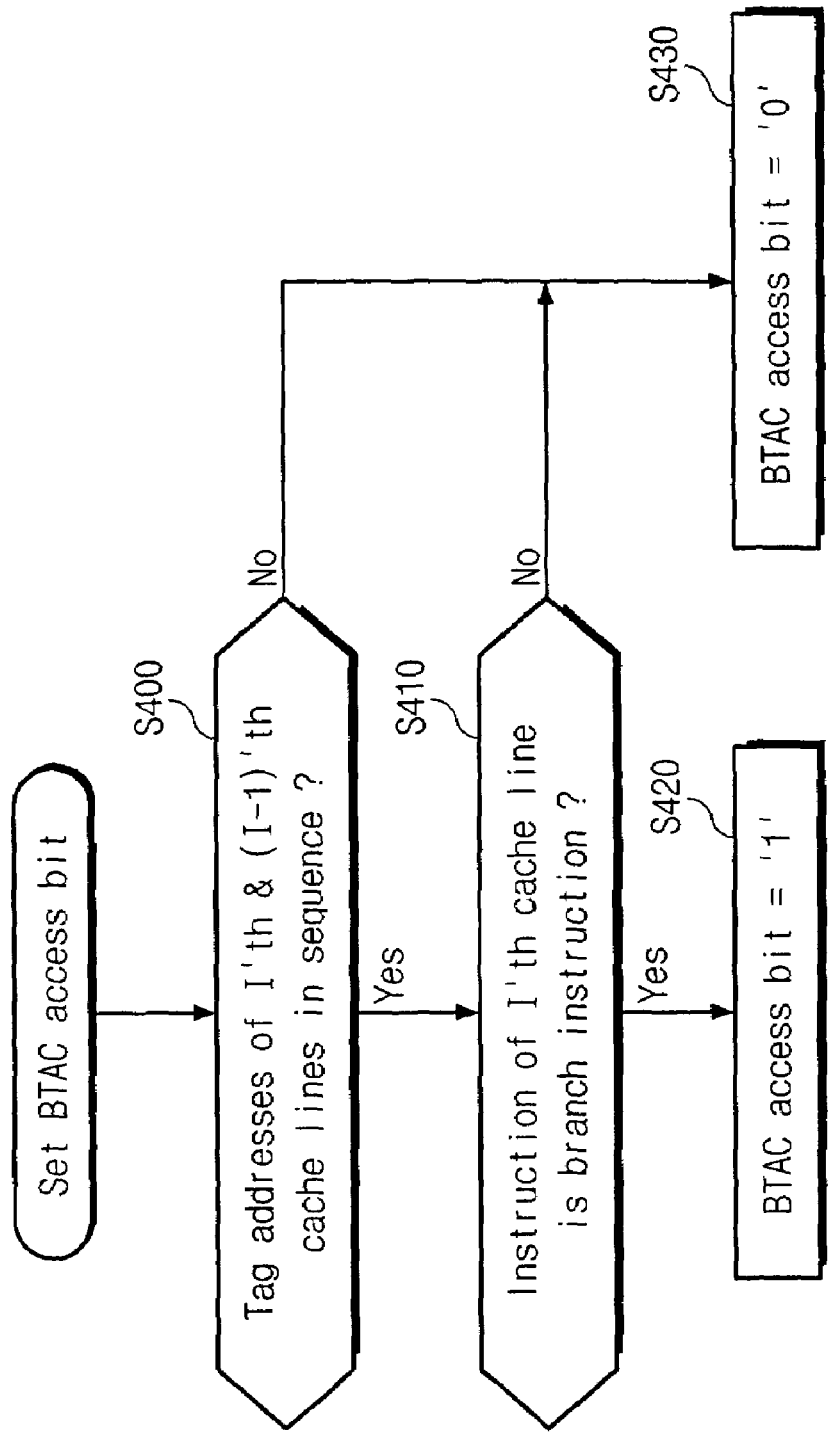
FIG. 6 is a flow chart illustrating a procedure of setting a BTAC access bit of a control logic unit 260 of FIG. 5, in accordance with the present invention.
Figure 7:
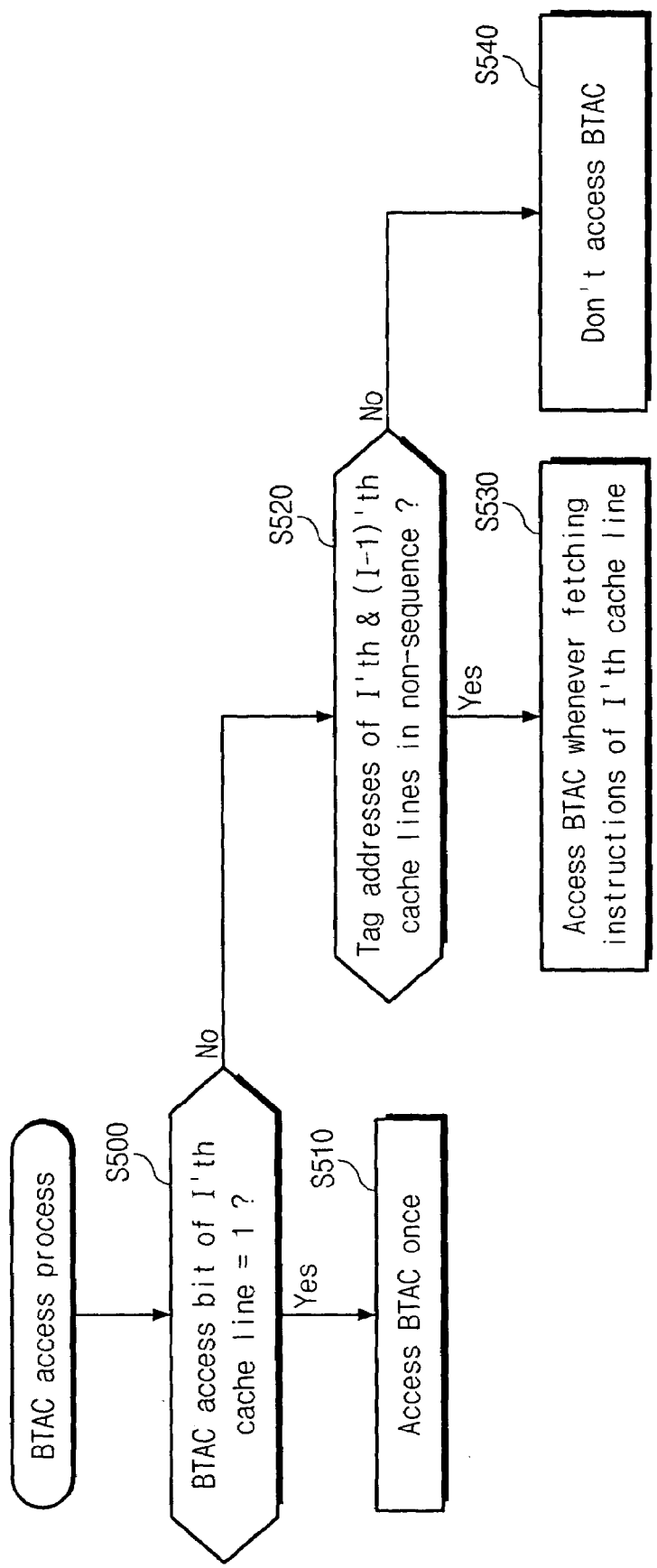
FIG. 7 is a flow chart illustrating a BTAC control process by the control logic unit 260 of FIG. 5, in response to the BTAC access bits, in accordance with the present invention.

Flow charts showing detailed operations of the control logic unit 260 are shown in FIGS. 6 and 7. First, referring to FIG. 6, the operation of establishing the BTAC access bits BP[n] for the BTAC access RAM 330 will now be explained.

In step S400, the control logic unit 260 determines whether a tag address stored in an I'th (I is a positive integer) cache line that is currently accessed in the instruction cache tag RAM 310 and a tag address of a (I−1)'th cache line that has been accessed prior to the I'th are sequentially generated. If the tag addresses of the I'th and (I−1)'th cache lines in the instruction tag RAM 310 are generated in sequence, the control operation advances to step S410.

In step S410, the control logic unit 260 determines whether an instruction stored in the I'th cache line that is currently accessed in the instruction cache tag RAM 320 is a branch instruction. The instruction cache tag RAM 320 according to a preferred embodiment of the invention stores four instructions in each cache line thereof. Therefore, in the step S410, the control logic unit 260 determines whether at least one of instructions stored in the I'th cache line being accessed at present is a branch instruction. If there is at least one branch instruction in the currently accessed I'th cache line of the instruction cache data RAM 320, operation advances to step S420.

In the step S420, the control logic unit 260 sets a BTAC access bit of the BTAC access RAM 330, corresponding to the (I−1)'th cache line previously accessed in the instruction cache, to '1'.

From the results of the steps S400 and S410, if tag addresses of the I'th and (I−1)'th cache lines in the instruction cache tag RAM 310 are not in sequence or if all of instructions stored in the currently accessed I'th cache line of the instruction cache tag RAM 320 are not branch instructions, the control logic unit 260 advances operation to step S430.

In the step S430, the control logic unit 260 sets a BTAC access bit of the BTAC access RAM 330, corresponding to the (I−1)'th cache line previously accessed in the instruction cache, to '0'.

As can be seen from the example shown above in FIG. 5, a tag address 0x100 stored in a currently accessed cache line Lb and a tag address 0x0ff stored in a previously accessed cache line La are provided thereto in sequence when a cache line Lb of the instruction cache tag RAM 310 is being accessed. Also, the currently accessed cache line Lb of the instruction cache data RAM 320 includes a branch instruction B1. Thus, a BTAC access bit BP[La] of the previously accessed cache line La of the instruction cache is set to '1'. A BTAC access bit BP[Lb] corresponding to the cache line Lb of the instruction cache is set when the next cache line adjacent to the cache line Lb of the instruction cache is processed.

A tag address 0x212 stored in a cache line Ld and a tag address 0x110 stored in a cache line Lc, in the instruction cache tag RAM 310, are not in sequence with each other.

Therefore, a BTAC access bit BP[Lc] corresponding to the cache line Lc is set to '0'.

While a tag address 0x220 stored in a cache line Le and a tag address 0x221 stored in a cache line Lf, in the instruction cache tag RAM 310, are in sequence, there is no branch instruction in the cache line Lf of the instruction cache data RAM 310. Thus, a BTAC access bit BP[Le] is set to '0' in correspondence with the cache line Le.

A process for accessing the BTAC access bit by the control logic unit 260 will now be described with reference to FIG. 7.

In step S500, the control logic unit 260 determines whether a BTAC access bit corresponding to the I'th cache line currently accessed in the instruction cache is '1'. If the BTAC access bit is '1', the operation advances to step S510.

In the step S510, the control logic unit 260 accesses the BTAC a single time (i.e., for one cycle). An index address accessing the BTAC tag RAM 210 and the data RAM 220 is PfuAddr[6:0]=PCFE[6:0]. The comparator 250 activates or inactivates a hit signal HIT in accordance with a matching condition between a tag address BtacTLAddr[31:7], which is provided from the BTAC tag RAM 210, and a tag address PCFE[31:7] that is provided from the processor.

The control logic unit 260 selectively stores the address BtacTaddr[31:0] read out from the index address PfuAddr[6:0]=PCFE[6:0] of the BTAC data RAM 220 with reference to a counting value of the saturation counter 230 when the hit signal HIT is active. Also, the address BtacTaddr[31:0], which was stored when the (I+1)'th cache line as the next cache line of the instruction cache, is provided as the branch address BTA[31:0]. Therefore, if a branch instruction among instructions of the (I+1)'th cache line of the instruction cache data RAM 320 is resolved, the branch address BTA[31:0] is provided as the next fetch address.

In a preferred embodiment of the invention, the saturation counter 230 is composed of 2-bit counters in number of m each corresponding to the BTAC cache lines. A state machine for the saturation counter 230 is illustrated in FIG. 8.

Figure 8:
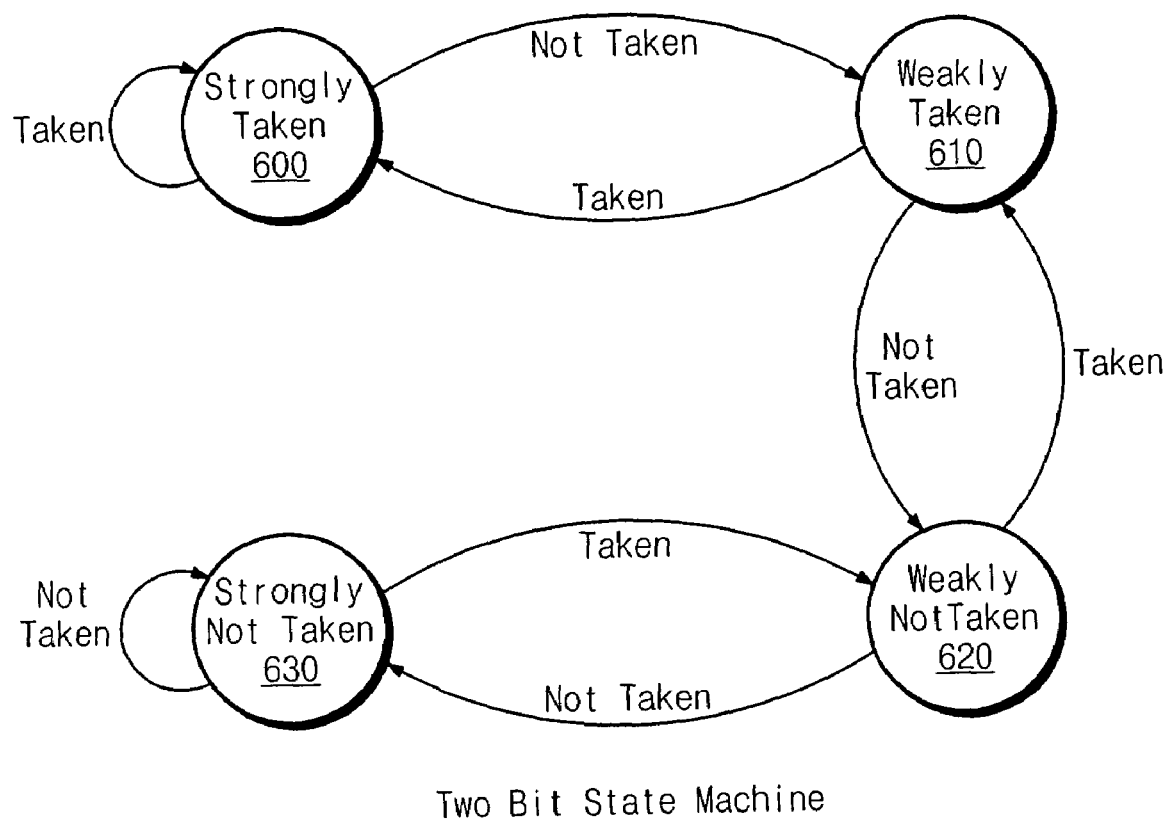
FIG. 8 illustrates a state machine of a saturation counter, in accordance with the present invention.

With reference to FIG. 8, when the tag address is conditioned in a hit state in the BTAC tag RAM 210, a counting value of the saturation counter 230 determines whether the branch address stored in the BTAC data RAM 220 is to be established as the next fetch address. If the counting value is '00', it is conditioned in Strongly-Not-Taken. If the counting value is '01', it is conditioned in Weakly-Not-Taken. If the counting value is '10', it is conditioned in Weakly-Taken. If the counting value is '11', it is conditioned in Strongly-Taken. Technical features about such a saturation counter 230 are disclosed in detail in U.S. Pat. No. 6,253,316, entitled "Three history branch history using one bit in a branch prediction mechanism", issued on Jun. 26, 2001 for Thang M. Tran et al.

Returning to FIG. 7, if at step S500, the BTAC access bit corresponding to the I'th cache line is determined as to be '0', operation control is advanced to step S520.

At step S520, the control logic unit 260 determines whether a tag address of the I'the cache line currently accessed in the cache instruction tag RAM 310 is non-sequential to a tag address of the (I−1)'th cache line previously accessed. As a result of the determination, if the tag addresses of the I'th and (I−1)'th cache lines are not arranged in sequence, the operation advances to step S530.

In step S530, the control logic unit 260 accesses the BTAC whenever four instructions of the I'th cache line in the instruction cache are fetched.

At step S520, if the tag addresses of the I'th and (I−1)'th cache lines are arranged in sequence, the operation advances to step S540.

In step S540, the control logic S540 does not access the BTAC.

The operation of the control logic unit 260 will now be described in accordance with exemplary values of the BTAC access bits stored in the BTAC access RAM 330, in conjunction with FIGS. 5, 9A, and 9B.

FIG. 9A illustrates a pipelining feature of accessing the BTAC when tag addresses stored in (I−1)'th and I'th cache lines of the instruction cache tag RAM 310 are generated in sequence. As the BTAC access bit BP[La] is '1' in correspondence with the cache line La when the cache line La of the instruction cache is being accessed, the BTAC is accessed only a single time when instruction I11 is fetched (FE). In FIG. 9A, while it denotes that the BTAC is accessed in the fetch cycle FE, the BTAC is required to be fetched only once when instructions on the cache line La are being fetched. That is because the branch address read out from the BTAC is used in the next cache line Lb.

As the tag address 0x0ff stored in the cache line La and the tag address 0x100 stored in the cache line Lb are arranged in sequence when the cache line Lb of the instruction cache is accessed, the control logic unit 260 does not access the BTAC.

FIG. 9B illustrates a pipelining feature of accessing the BTAC when tag addresses stored in (I–1)'th and I'th cache lines of the instruction cache tag RAM 310 are generated non-sequentially.

As the tag address 0x110 stored in the cache line Lc and the tag address 0x212 stored in the cache line Ld are arranged non-sequentially when the cache line Ld of the instruction cache is accessed, the BTAC needs to be accessed whenever fetching instructions B2, I41, I42, and I43 stored in the cache line Ld.

As aforementioned, since the tag address 0x110 stored in the cache line Lc and the tag address 0x212 stored in the cache line Ld are arranged in non-sequence although there is the branch instruction B2 n the cache line Ld, the BTAC access bit BP[Lc] has been set to '0'. Therefore, as the BTAC has not been accessed while accessing the previous cache line Lc, the branch instruction B2 must be accessed for processing the branch instruction B2.

But, in the case of a cache line Lf, as an BTAC access bit 330 is '0' in correspondence with the cache line Lf and a tag address 0x220 of the cache line Le and a tag address 0x221 of the cache line Lf are generated in sequence, the BTAC need not to be accessed.

Figure 1:
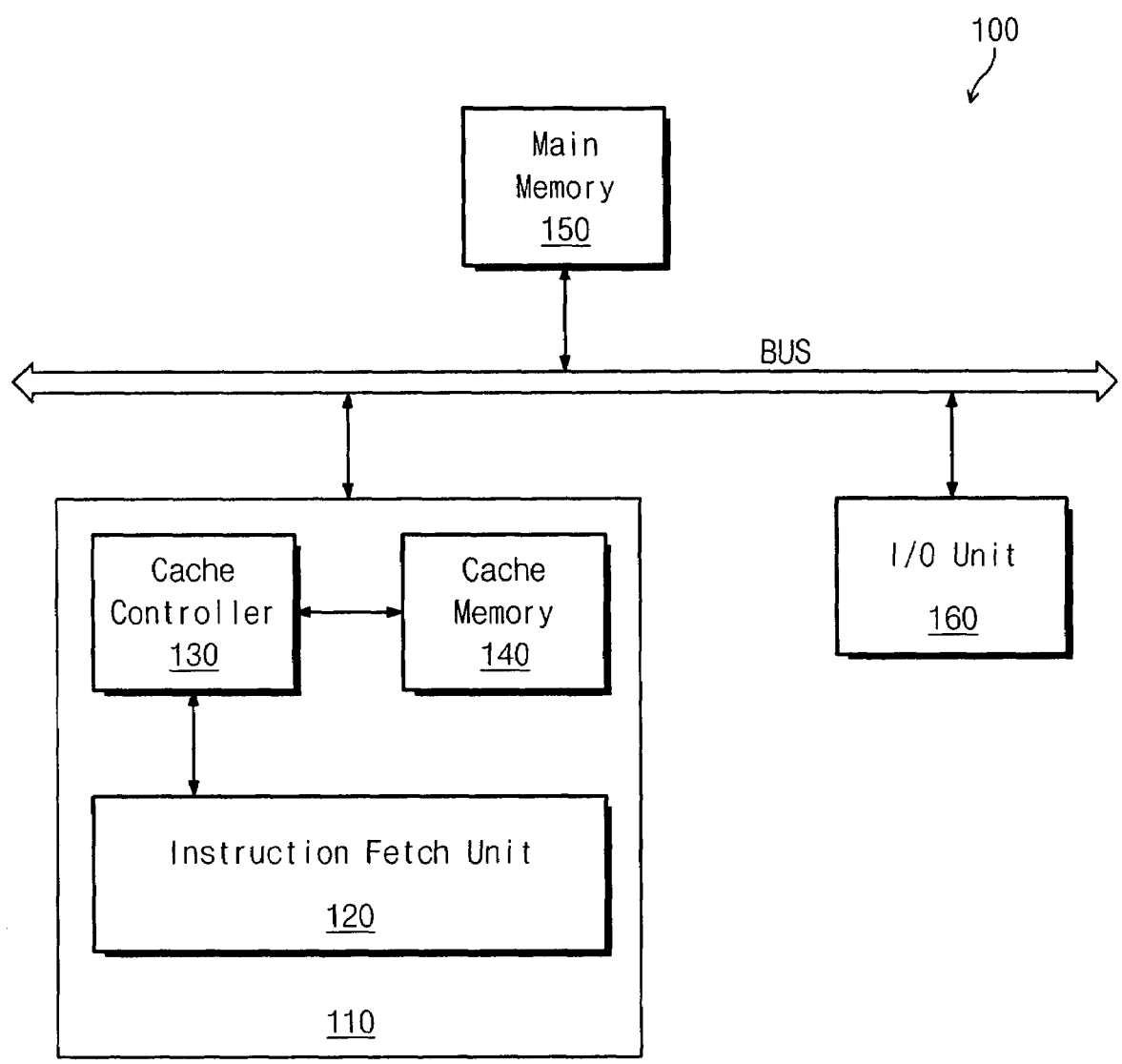
FIG. 1 is a block diagram illustrating a conventional computer system employing a branch prediction mechanism.
Figure 2:
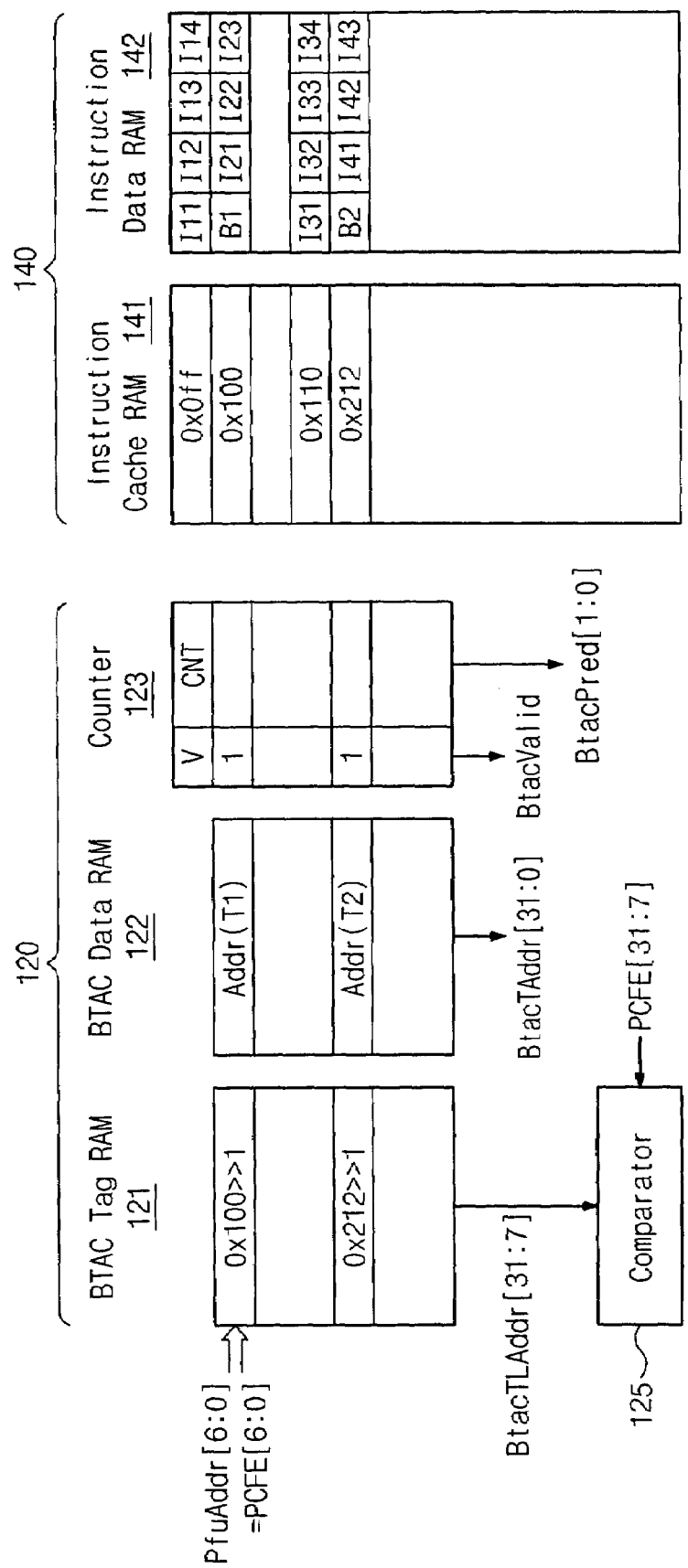
FIG. 2 is a schematic diagram illustrating conventional architectures of an instruction cache embedded in a cache memory and a BTAC embedded in an instruction fetch unit.
Figure 4A:
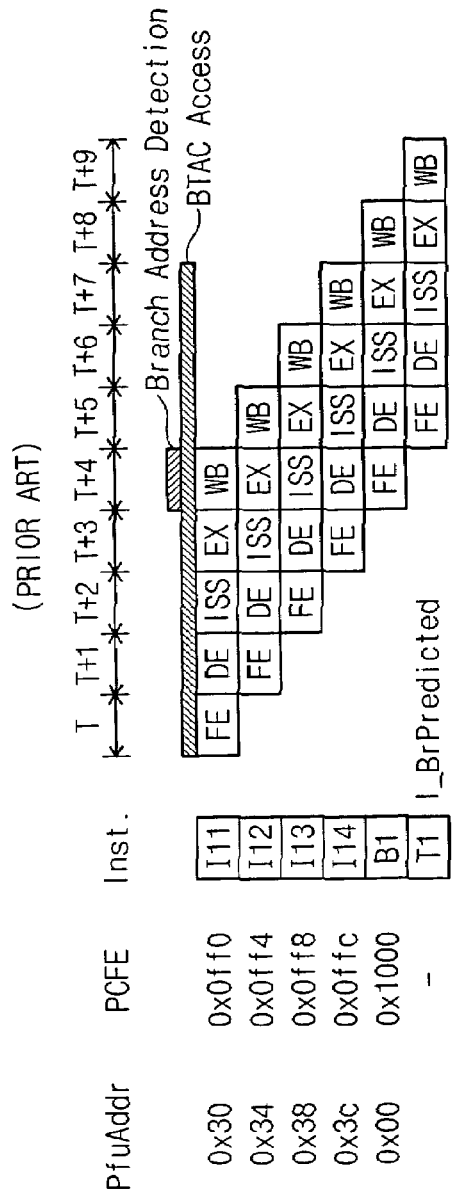
FIGS. 4A and 4B illustrate sequential features of accessing the BTAC when instructions are being processed in the conventional instruction pipeline shown in FIG. 3.
Figure 4B:
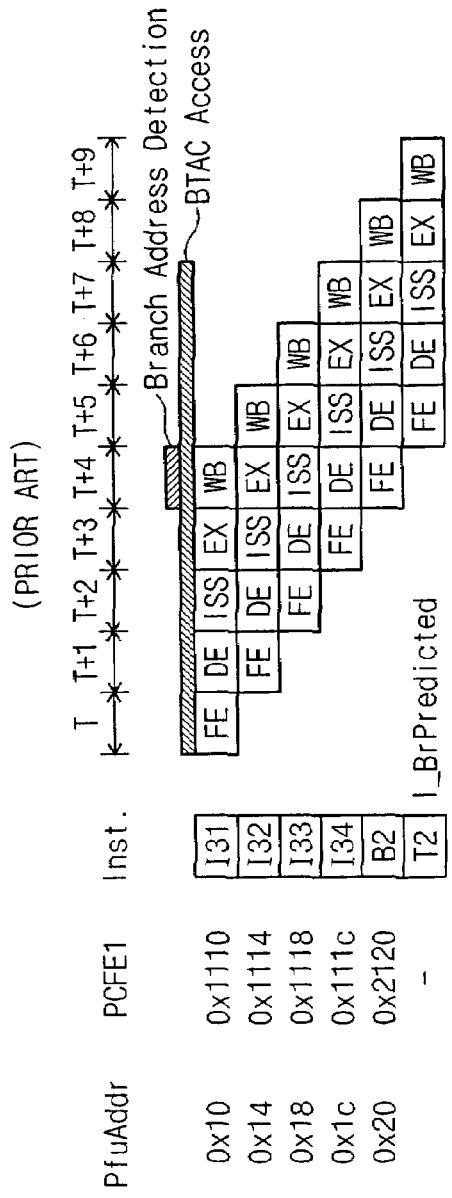

Comparing the features of FIGS. 4A and 9A, and of FIGS. 4B and 9B, it can be seen that the cache system according to the present invention has a BTAC access time considerably shorter than the conventional cache system. In other words, the cache system of the invention accesses the BTAC for one cycle when the BTAC access bit assigned to the I'th cache line accessed at present in the instruction cache is set to '1'. This reduces power consumption by decreasing the number of access for the BTAC, as compared to the conventional case that accesses the BTAC every cycle.

Moreover, power consumption is minimized by interrupting the BTAC accessing operation while prosecuting the instruction stored in the I'th cache line when the tag address of the I'th cache line currently being accessed and the tag address of the (I–1)'th cache line previously accessed are in sequence and the BTAC access it BP[I] is '0'.

When the tag address of the I'th cache line currently being accessed and the tag address of the (I–1)'th cache line previously accessed are not in sequence, the BTAC is accessed every time during cycles which process instructions stored in the I'th cache line currently accessed, as in the conventional architecture. This is because, if the tag address of the I'th cache line currently being accessed and the tag address of the (I–1)'th cache line previously accessed are not in sequence, it is impossible to predict the (I+1)'the cache line, which is to be accessed as the next, from the currently accessed I'th cache line when a branch prediction results in Not-Taken.

While this invention has been particularly shown and described with references to preferred embodiments thereof, it will be understood by those skilled in the art that various changes in form and details may be made herein without departing from the spirit and scope of the invention as defined by the appended claims.

The systems and methods of the present invention as described above can reduce unnecessary power consumption by minimizing the frequency of access operations for the BTAC.

What is claimed is:

1. A cache system comprising:
an instruction cache including a plurality of cache lines storing tag addresses and instructions;
a branch target address cache (BTAC) storing a predicted target address of a branch instruction stored in the instruction cache;
a storage unit storing BTAC access bits each corresponding to the cache lines, the BTAC access bit indicating whether a branch instruction is stored in a cache line adjacent a cache line corresponding thereto; and
a control logic unit setting values of the BTAC access bits and selectively accessing the BTAC according to the value of the BTAC access bit corresponding to an I'th cache line currently accessed in the instruction cache.

2. The cache system as set forth in claim 1, wherein when a tag address of the I'th (I is a positive integer) cache line currently accessed and a tag address of the (I–1)'th cache line previously accessed are in sequence with each other and an instruction of the currently accessed I'th cache line is a branch instruction, the control logic unit sets the BTAC access bit of the previously accessed (I–1)'th cache line to a first value.

3. The cache system as set forth in claim 2, wherein when a tag address of the I'th cache line currently accessed and a tag address of the (I–1)'th cache line previously accessed are in sequence with each other and an instruction of the currently accessed I'th cache line is not a branch instruction, the control logic unit sets the BTAC access bit of the previously accessed (I–1)'th cache line to a second value.

4. The cache system as set forth in claim 3, wherein when a tag address of the currently accessed I'th cache line and a tag address of the previously accessed (I–1)'th cache line are not in sequence with each other, the control logic unit sets the BTAC access bit of the previously accessed (I–1)'th cache line to the second value.

5. The cache system as set forth in claim 4, wherein when a BTAC access bit corresponding to the currently accessed I'th cache line of the instruction cache is the first value, the control logic unit accesses the BTAC.

6. The cache system as set forth in claim 5, wherein when a BTAC access bit corresponding to the previously accessed (I–1)'th cache line of the instruction cache is the second value, and a tag address of the currently accessed I'th cache line and a tag address of the previously accessed (I–1)'th cache line are in sequence with each other, the control logic unit does not access the BTAC while accessing the I'th cache line.

7. The cache system as set forth in claim 6, wherein when a BTAC access bit corresponding to the previously accessed (I–1)'th cache line of the instruction cache is the second value, and a tag address of the currently accessed I'th cache line and a tag address of the previously accessed (I–1)'th cache line are not in sequence with each other, the control logic unit accesses the BTAC while accessing the I'th cache line.

8. The cache system as set forth in claim 6, wherein when a tag address of the currently accessed I'th cache line and a tag address of the previously accessed (I–1)'th cache line are not in sequence with each other, the control logic unit accesses the BTAC while accessing the I'th cache line.

9. The cache system as set forth in claim 1, each of the cache lines in the instruction cache stores a tag address and plural instructions.

10. The cache system as set forth in claim 9, wherein when a tag address of the currently accessed I'th cache line and a tag address of the previously accessed (I–1)'th cache line are in sequence with each other and one of instructions on the currently accessed I'th cache line is at least a branch instruction, the control logic unit sets the BTAC access bit corresponding with the previously accessed (I−1)'th cache line to a first value.

11. The cache system as set forth in claim 10, wherein when a tag address of the currently accessed I'th cache line and a tag address of the previously accessed (I−1)'th cache line are in sequence with each other and instructions on the currently accessed I'th cache line are not all branch instructions, the control logic unit sets the BTAC access bit corresponding with the previously accessed (I−1)'th cache line to a second value.

12. The cache system as set forth in claim 11, wherein when a tag address of the currently accessed I'th cache line and a tag address of the previously accessed (I−1)'th cache line are not in sequence with each other, the control logic unit sets the BTAC access bit corresponding with the previously accessed (I−1)'th cache line to the second value.

13. The cache system as set forth in claim 12, wherein when the BTAC access bit corresponding with the currently accessed I'th cache line of the instruction cache is the first value, the control logic unit accesses the BTAC.

14. The cache system as set forth in claim 13, wherein when the BTAC access bit corresponding with the previously accessed (I−1)'th cache line of the instruction cache is the second value and a tag address of the currently accessed I'th cache line and a tag address of the previously accessed (I−1)'th cache line are in sequence with each other, the control logic unit does not access the BTAC while accessing the I'th cache line.

15. The cache system as set forth in claim 14, wherein when the BTAC access bit corresponding with the previously accessed (I−1)'th cache line of the instruction cache is the second value and a tag address of the currently accessed I'th cache line and a tag address of the previously accessed (I−1)'th cache line are not in sequence with each other, the control logic unit accesses the BTAC whenever fetching the instructions of the I'th cache line in sequence.

16. The cache system as set forth in claim 15, wherein when a tag address of the currently accessed I'th cache line and a tag address of the previously accessed (I−1)'th cache line are not in sequence with each other, the control logic unit accesses the BTAC whenever fetching the instructions of the I'th cache line in sequence.

17. The cache system as set forth in claim 16, wherein the instruction cache comprises:
   an instruction tag cache storing the tag address; and
   an instruction data cache storing the instruction,
   wherein each of the instruction tag and data caches includes a plurality of cache lines, the cache lines of the instruction tag cache corresponding to the cache lines of the instruction data cache.

18. The cache system as set forth in claim 17, wherein the BTAC includes a plurality of BTAC lines storing the predicted target address of the branch instruction stored in the instruction cache.

19. The cache system as set forth in claim 18, wherein an index to access the BTAC lines of the BTAC is identical to an index to access the cache lines of the instruction cache.

20. The cache system as set forth in claim 19, wherein the control logic unit accesses the BTAC line of the BTAC by referring to the index to access the cache lines of the instruction cache.

21. The cache system as set forth in claim 18, wherein an index to access the BTAC lines of the BTAC is partially identical to an index to access the cache lines of the instruction cache.

22. The cache system as set forth in claim 21, wherein the control logic unit accesses the BTAC line of the BTAC by partially referring to the index to access the cache lines of the instruction cache.

23. The cache system as set forth in claim 18, wherein when the BTAC access bit is the first value, the control logic unit accesses the BTAC line of the BTAC only a single time.

24. The cache system as set forth in claim 23, wherein when a tag address of the currently accessed I'th cache line and a tag address of the previously accessed (I−1)'th cache line are not in sequence with each other, the control logic unit accesses the same BTAC line of the BTAC whenever fetching the instructions of the I'th cache line in sequence.

25. A method of operating a cache system that includes an instruction cache including plural cache lines to store tag addresses and instructions, and a branch target address cache (BTAC) storing a predicted target address of a branch instruction stored in the instruction cache, and BTAC access bits each corresponding to the cache lines, for accessing the BTAC, the method comprising:
   determining whether a tag address of an I'th (I is a positive integer) cache line currently accessed and a tag address of an (I−1)'th cache line previously accessed are in sequence with each other;
   determining whether an instruction of the currently accessed I'th cache line is a branch instruction; and
   setting the BTAC access bit corresponding with the previously accessed (I−1)'th cache line to a first value when the tag addresses of the currently accessed I'th and previously accessed (I−1)'th cache lines are in sequence with each other and the instruction of the currently accessed I'th cache line is the branch instruction.

26. The method as set forth in claim 25, wherein the BTAC access bit corresponding with the previously accessed (I−1)'th cache line is set to a second value when the tag addresses of the currently accessed I'th and previously accessed (I−1)'th cache lines are in sequence with each other and the instruction of the currently accessed I'th cache line is not the branch instruction.

27. The method as set forth in claim 26, wherein the BTAC access bit corresponding with the previously accessed (I−1)'th cache line is set to a second value when the tag addresses of the currently accessed I'th and previously accessed (I−1)'th cache lines are not in sequence with each other.

28. The method as set forth in claim 27, further comprising:
   determining a value of the BTAC access bit corresponding to the currently accessed I'th cache line of the instruction cache; and
   accessing the BTAC when the BTAC access bit is the first value in correspondence with the currently accessed I'th cache line.

29. The method as set forth in claim 28, further comprising:
   determining whether the tag addresses stored in the currently accessed I'th and previously accessed (I−1)'th cache lines are in sequence with each other; and
   accessing the BTAC while accessing the I'th cache line when the BTAC access bit corresponding with the previously accessed (I−1)'th cache line is the second value and the tag addresses of the currently accessed I'th and previously accessed (I−1)'th cache lines are not in sequence with each other.

30. The method as set forth in claim 29, further comprising not accessing the BTAC while accessing the I'th cache line when the BTAC access bit corresponding with the previously accessed (I−1)'th cache line is the second value and the tag addresses of the currently accessed I'th and previously accessed (I−1)'th cache lines are in sequence with each other.

31. The method as set forth in claim 30, wherein each of the cache lines in the instruction cache stores a tag address and plural instructions.

32. The method as set forth in claim 31, further comprising accessing the BTAC whenever fetching the instructions of the I'th cache line in sequence when the BTAC access bit corresponding with the previously accessed (I−1)'th cache line is the second value and the tag addresses of the currently accessed I'th and previously accessed (I−1)'th cache lines are not in sequence with each other.

* * * * *